United States Patent Office 3,208,974
Patented Sept. 28, 1965

3,208,974
PROCESS FOR PREPARING FORMALDEHYDE-AROMATIC HYDROCARBON RESIN
Lyman R. Roberts, Concord, Calif., assignor to Shell Oil Company, New York, N.Y., a corporation of Delaware
No Drawing. Filed Dec. 1, 1961, Ser. No. 156,484
2 Claims. (Cl. 260—67)

This invention relates to the production of improved resins from certain aromatic petroleum fractions and to the resulting product.

Resins have been produced by a number of processes in which various aromatic hydrocarbon fractions were condensed with aldehydes such as formaldehyde. Technical difficulties are encountered however in the production of such resins in two major respects: first, most of the resins produced are originally dark in color and require further treatment to remove the color bodies or colored fractions. The reason for this is apparently twofold, namely, the source of aromatic fractions so treated and the resinification conditions. Further, the production of resins has required extended reaction time with the several catalyst and solvent environments explored. This, of course, results in increased product cost and in reduced through-put for a plant of a given size. If a resin could be obtained from a by-product stream of a petroleum refinery which was light colored and at the same time was produced from a reaction of relatively short duration, the resin would be extremely low cost and therefore competitive with the number of other products both natural and synthetic now utilized for many diverse purposes.

It is an object of the present invention to provide a process for the production of improved resins. It is another object of the invention to provide improved resins derived from certain aromatic hydrocarbon fractions. It is a further particular object of the invention to provide a light colored resin by a process requiring relatively short reaction time. Other objects will become apparent during the following description of the invention.

Now, in accordance with this invention, a novel resin product is obtained comprising the total condensation product of formaldehyde with a certain aromatic hydrocarbon feed, said feed boiling within the limits from about 450° F. to about 715° F., the feed being substantially free of olefin hydrocarbons and of alpha-alkyl naphthalenes and containing at least about 70% by weight of beta-alkyl naphthalenes (including $\beta,\beta'$ dialkyl naphthalenes) the resins produced having an average molecular weight between about 450 and about 650, a ring and ball softening point of 200–280° F. and an ASTM color in 20% benzene solution of between about 4.0 and 7.5.

Still in accordance with this invention a process is provided whereby light colored resins having the above properties are produced which comprises reacting formaldehyde with the described aromatic hydrocarbon feed in the presence of a water soluble fatty acid having from 1 to 4 carbon atoms per molecule and zinc chloride, the reaction being carried on for a period of time between about 0.5 and 2.5 hours at the reflux temperature of the fatty acid.

In its preferred form, the resin so described is derived from an aromatic hydrocarbon feed boiling within the limits from about 460 and 700° F., containing at least about 70% by weight of beta alkyl naphthalenes and/or $\beta,\beta'$-dialkyl naphthalenes and 5–25% by weight of partially hydrogenated bicyclic hydrocarbon in the presence of acetic acid and zinc chloride, the preferred process embodies the use of the above components which are heated together for a time between about 0.75 and about 2 hours at the reflux temperature of acetic acid (about 115° C.). Still in accordance with the preferred aspect of the invention, it is preferred that the resin have an average molecular weight of between about 475 and 600, a softening point of 215–270° F. and an ASTM color in 20% benzene solution of between about 4.5 and 7. The above preferred resin is produced by the use of the acid medium (1.0–7.5 volumes of acid per volume of aromatic feed) and zinc chloride catalyst (1–12% based on the acetic acid), while the proportion of formaldehyde is preferably restricted to an amount between about 15 and about 30% by weight based on the hydrocarbon feed.

One of the essential aspects of the invention comprises the discovery of an economic source of feed hydrocarbons which have been found to have precisely the components so highly desired in a resin and which enable the production of a light colored resin while utilizing the short reaction times recited hereinbefore. Of course, it is possible to obtain the desired feed by artificially assembling desired beta-alkyl naphthalenes and diluting them, if desirable, with partially hydrogenated bicyclic hydrocarbons. However, from an economic standpoint, it is much more efficient to utilize hydrocarbons meeting these requirements as long as undesirable components are virtually absent from such a source. Consequently, in accordance with one aspect of the present invention it has been found that the bottoms fraction from a catalytic reforming operation on a hydrocarbon stream constitutes a highly desirable source of such hydrocarbons.

In reforming operations, the objective is normally to convert naphthenes to aromatics. Certain side reactions also occur, but it has been found that the bottoms obtained from the re-distillation of platformed or other reformed products constitutes the optimum source of aromatic hydrocarbon feeds for use in the present invention. This is due to the fact that reformate bottoms boiling within the cited boiling range, particularly platformate bottoms, contain substantially no olefinic components and less than about 10% by weight of alkyl benzenes, the bottoms being composed substantially entirely of at least about 70% of beta-alkyl naphthalenes (including $\beta,\beta'$-dialkyl naphthalenes) and 5–25% by weight of partially hydrogenated bicyclic hydrocarbons, usually referred to as tetralins and indanes.

In the course of making the present invention, numerous hydrocarbon streams from petroleum refineries were examined to determine their constitution. However, when resins were made from such streams with formaldehyde using various catalyst and solvent systems, it was found that they were all unsatisfactory in one way or another. For example, many aromatic extracts from refineries are obtained in the preparation of lubricating oils. However, such extracts contain not only a certain amount of heterocyclic compounds but also alpha-alkyl naphthalenes and other polynuclear aromatics in addition to the desired beta-alkyl naphthalenes. The investigation leading to the present invention demonstrated that alpha-alkyl naphthalenes are undesirable for the present purpose since they form relatively dark colored and insoluble resins with formaldehyde, as contrasted to the light colored soluble resins obtained from condensation of formaldehyde and beta-alkyl naphthalenes.

Further search for suitable streams disclosed that aromatic petroleum fractions from distillates such as those obtained by treating virgin naphthas from aromatic based petroleums with liquid $SO_2$ contained lower boiling aromatics indicating the preponderance therein of alkyl benzenes. Condensation of such fractions with formaldehyde resulted in light, amber-colored resins but only after extended reaction times. Moreover, in many cases the resins so obtained were relatively low in melting point and, if shorter reaction times were employed, the non-solid resins were obtained. Consequently, the most preferred and economic source of suitable hydrocarbon feeds for use in the present invention comprises the bottoms product obtained by the distillation of reformate, commonly referred to as reformate bottoms, said bottoms having a preferred boiling range between about 450° and about 715° at atmospheric pressure. Such streams usually contain at least about 70% by weight of beta-alkyl naphthalenes, substantially no olefins and substantially no alpha-alkyl naphthalenes. The principal components other than beta-alkyl naphthalenes are tetralins and indanes, both of these being regarded as "partially hydrogenated bicyclic hydrocarbons." Numerous catalytic systems were investigated in the course of making the present invention, these included the use of well-known condensation catalysts such as sulfuric acid, aluminum chloride, and other catalysts. In addition to the zinc chloride, a number of reaction solvents were studied including formic acid in addition to fatty acids having from 2 to 4 carbon atoms per molecule (the latter including acetic, propionic, butanoic acids and mixtures thereof). In investigating the catalyst systems referred to above, it was found that most of them were too active to result in the preparation of light colored resins which are so highly desired. In many cases, in fact, it was found that resins were produced which were tarry in color (being blackish brown), and at the same time were undesirable with respect to their solubility characteristics. Active catalysts such as sulfuric acid or aluminum chloride normally formed highly infusible and insoluble resins having little utility for the contemplated purposes even when the preferred source of hydrocarbon aromatic feed was utilized therewith. Investigation further shows that the only catalyst system found to be satisfactory both with respect to product solubility and product color was zinc chloride and that the only suitable reaction medium was one or more fatty acids having from 1 to 4 carbon atoms per molecule. The use of formic acid was considered but it was found that the resin resulting from the use of such a reaction solvent was low in melting point (being even fluid at room temperature) and the resin was of relatively low molecular weight. While it might be possible to utilize pressure, and thereby higher reaction temperatures, this constitutes a process disadvantage when compared with more suitable fatty acids such as acetic acid (or propionic and/or butanoic acid) where the reflux temperature of the acids is employed to control the temperature of the reaction. Under these complex sets of requirements therefor, the present invention is restricted both with respect to the aromatic hydrocarbon feed, with respect to the catalyst employed and with respect to the acid solvents utilized as the reaction medium. When combined within the proportions described hereinbefore, it has been possible to produce resins having an average molecular weight between about 450 and 650, a ring and ball softening point between about 200 and about 280° F., and an ASTM color between about 4.5 and 7.5 in 20% benzene solution while employing relatively short reaction times (0.5–2.5 hours) at the reflux temperature of the fatty acid reaction medium. Thus, the resin constituting the total condensation product of formaldehyde with the specified aromatic hydrocarbon feed, constitutes a novel resin sharply differentiated from those produced by prior art processes. In the prior art, it was found necessary to fractionate the feed to remove chromophoric precursors and/or the product in order to remove insoluble and/or dark colored fractions in order to obtain light colored fractions; or it was found essential to utilize prolonged reaction times, in order to obtain light colored resins from alkyl benzenes. The latter, being essentially mono-functional with respect to formaldehyde, required these long times in order to result in sufficient resinification to obtain useable resins.

One aspect of the invention comprises utilizing the above reaction mixture components within preferred proportion ranges in order to obtain the desired resin, light colored and high melting, soluble in the usual solvents and compatable with many organic polymers, within relatively short reaction times. The preferred conditions comprised the use of $C_{2-4}$ fatty acid in an amount between about 1.0 and 7.5 volumes per volume of aromatic feed; a zinc chloride concentration in the order of 1–12% based on the weight of acetic acid and a formaldehyde concentration in an amount between about 15–30% by weight based on the hydrocarbon feed. Under these conditions the polymers have the desirable properties described above.

Suitable hydrocarbon feeds are typified by the following:

TABLE.—AROMATIC HYDROCARBON FEEDS

| Sample | 1 | 2 | 3 | 4 | 5 | 6 | 7 | 8 |
|---|---|---|---|---|---|---|---|---|
| Yield, percent w. on total reformate | 0.89 | 1.01 | 1.00 | 1.00 | 0.97 | 0.98 | 0.99 | 0.97 |
| Gravity, °API | 8.8 | 10.2 | 9.5 | 9.3 | 9.7 | 10.7 | 10.9 | 11.3 |
| ASTM Distillation, °F.: | | | | | | | | |
| IBP | 486 | 452 | 474 | 472 | 470 | 462 | 460 | 454 |
| EP | 700 | 656 | 684 | 684 | 678 | 652 | 636 | 644 |
| 10% | 498 | 488 | 486 | 486 | 480 | 470 | 470 | 468 |
| 50% | 508 | 502 | 500 | 500 | 496 | 486 | 486 | 488 |
| 90% | 576 | 548 | 546 | 552 | 544 | 536 | 532 | 520 |
| Flash point, °F. PMcc | 250 | 230 | 240 | 235 | 240 | 235 | 230 | 225 |
| Color, ASTM, D-1500 | L 6.5 | 5.0 | L 5.0 | L 5.5 | L 5.0 | L 4.0 | L 3.5 | L 3.5 |
| Aromatics Distribution, percent v.: | | | | | | | | |
| Anthracenes and phenanthrenes | 0.2 | 0.1 | 0.2 | 0.2 | 0.2 | | | |
| Diphenyls | 2.6 | 1.9 | 2.2 | 2.3 | 2.0 | 0.8 | 1.3 | 1.2 |
| Naphthalenes | 87.5 | 79.9 | 81.7 | 81.7 | 79.3 | 71.8 | 70.9 | 67.0 |
| Tetralins and indanes | 9.7 | 15.1 | 13.2 | 13.0 | 14.8 | 20.9 | 20.9 | 22.9 |
| Alkyl benzenes | | 3.0 | 2.7 | 2.8 | 3.7 | 6.5 | 6.9 | 8.9 |

For the above analysis, it will be seen that the platformate bottoms to be used in the present invention comprise those having at least 70% by weight (or volume) of naphthalenes. Further investigation by means of infrared analysis has shown that these naphthalenes are beta-alkyl naphthalenes and that alpha-alkyl naphthalenes are virtually absent from these streams. This distinguishes the preferred hydrocarbon source from another refinery product such as aromatic extracts which contain both alpha- and beta-alkyl naphthalenes.

The following examples illustrate the limitations of the present invention.

*Example I*

A platformer bottoms aromatic hydrocarbon feed was utilized in the comparative experiments, said feed having the following properties:

TABLE.—RESINS FROM CATALYTIC REFORMATE BOTTOMS

| Source of bottoms: | |
|---|---|
| Properties of feed— | Platformer |
| Gravity, ° API | 10.7 |
| Molecular weight | 156 |
| Color, ASTM | L 4.0 |
| ASTM distillation, ° F.— | |
| IBP | 460 |
| EP | 660 |
| 10% | 468 |
| 50% | 486 |
| 90% | 520 |
| Hydrocarbon type, percent w.— | |
| Naphthalenes | 71.0 |
| Tetralins and/or indanes | 22.3 |
| Alkyl benzenes | 6.7 |
| Carbon number, percent w.— | |
| C–10 | 0.7 |
| C–11 | 30.2 |
| C–12 | 49.8 |
| C–13 | 7.0 |
| C–14 | 2.3 |

The condensation was carried out as follows: 200 parts by volume of glacial acetic acid were mixed with 15 parts by weight of zinc chloride and 7.5 parts by weight of para-formaldehyde. These were heated at 50° C. with stirring to form a uniform solution, after which 37.5 parts by weight of the above hydrocarbon feed was added. The reaction mixture was heated to reflux, 115° C., for 1 hour after which 1 part by volume of water was added to coagulate the resin and spring it from the acid phase. The resin was dissolved in benzene and water washed to remove traces of acid and catalyst, after which benzene was removed under vacuum to isolate the resin.

A parallel experiment was performed in which the same proportion of formaldehyde and acid were employed except that formic acid was utilized in place of acetic acid and zinc chloride and the reaction was conducted at the reflux temperature of formic acid (100.5° C.). Although the reaction was conducted for 5 hours, the product was a relatively low melting resin having a ring-and-ball melting point of 170° F. By comparison, the resin produced with zinc chloride and acetic acid had a molecular weight of about 500, a ring-and-ball softening point of 217° F. and was light colored, having an ASTM color of L 5.5 (20% solution in benzene). This comparative experiment shows that formic acid is unsuitable for use in the present invention since it require such extended reaction times at the reflux temperature of formic acid and the resulting resin has too low a softening point to be satisfactory for many utility purposes.

*Example II*

A second preparation according to the present invention was employed with a platformer bottoms product of somewhat higher boiling point range. This platformer bottoms had the following properties:

| Source of bottoms: | Platformer |
|---|---|
| Gravity, ° API | 8.8 |
| Color, ASTM | L 6.0 |
| ASTM distillation, ° F.— | |
| IBP | 486 |
| EP | 700 |
| 10% | 498 |
| 50% | 508 |
| 90% | 576 |
| Hydrocarbon type, percent w.— | |
| Naphthalenes | 87.5 |
| Tetralins and/or indanes | 9.7 |
| Alkyl benzenes | Nil |
| Carbon number, percent w.— | |
| C–10 | ---- |
| C–11 | ---- |
| C–12 | ---- |
| C–13 | ---- |
| C–14 | ---- |

The proportion of reactants and the operating conditions are those described for the zinc chloride-acetic acid reaction in Example I. The product had an average molecular weight of 600, a ring-and-ball softening point of 265° F. and an ASTM color of 7.0.

*Example III*

A third reformer bottoms product was utilized in the process of the invention, the proportions of zinc chloride and acetic acid and the reaction conditions being those described in Example I. The hydrocarbon feed had the following properties:

| Source of bottoms: | Houdryformer |
|---|---|
| Molecular weight | 150 |
| Color, ASTM | L 8.0 |
| ASTM distillation, ° F.— | |
| IBP | 484 |
| EP | 706 |
| 10% | 488 |
| 50% | 506 |
| 90% | 584 |
| Hydrocarbon type, percent w.— | |
| Naphthalenes | 85.2 |
| Tetralins and/or indanes | 6.5 |
| Alkyl benzenes | 8.3 |
| Carbon number, percent w.— | |
| C–10 | ---- |
| C–11 | 40 |
| C–12 | 55 |
| C–13 | 5 |
| C–14 | ---- |

The product obtained has an average molecular weight of 580, a ring-and-ball softening point of 240° F. and an ASTM color of L 6.5 in 20% benzene solution.

The above experiments and associated experiments have shown that it is possible to produce light colored resins having desirably high softening points and solubilities as long as the catalyst system is restricted to zinc chloride in a $C_{2-4}$ fatty acid medium and the feed is one having at least 70% by weight of beta-alkyl naphthalenes (including $\beta,\beta'$ dialkyl naphthalenes) the alkyl group being from 1 to 3 carbon atoms each, substantially no alpha-alkyl naphthalenes and no olefins. Any remaining hydrocarbon types which may be present in the desired feed comprises 5–25% of tetralins and indanes with less than 10% of alkyl benzenes.

Due to their optimum combination of physical properties, solubilities and light color, the resins of this invention are useful for a number of purposes. These include their admixture (physically or chemically) with many types of resins and polymers including epoxy resins, rosins, rubbers, and the like since such compositions may be employed in the preparation of castings, films, extrusions, lacquers, and other coatings as well as in the sizing of textiles and papers and in the formation of adhesives and laminating combinations.

I claim as my invention:

1. The process for the preparation of a resin which comprises reacting formaldehyde with an aromatic hydrocarbon fraction boiling within the limits from about 460 to about 700° F., said fraction being a bottoms fraction obtained from the distillation of reformed petroleum products substantially free from olefins and alpha-alkyl naphthalenes and containing at least about 70% by weight of beta-alkyl naphthalenes and 5–25% by weight of partially hydrogenated bicyclic hydrocarbons of the group consisting of tetralins, indanes and mixtures thereof in the presence of acetic acid and zinc chloride for 0.75–2 hours at the acetic-acid reflux temperature under substantially anhydrous conditions whereby substantially only light-colored resins are formed, said resins containing substantially no dark-colored components and having an average molecular weight of 475–600, and separating said resins from the reaction mixture.

2. The process for the preparation of a resin which comprises reacting 15–30 parts by weight of formaldehyde with 100 parts by weight of an aromatic bottoms fraction boiling between 460° and 700° F. obtained by distillation of platformed petroleum products, said bottoms fraction being substantially free from olefins and alpha-alkyl naphthalenes and containing at least about 70% by weight of beta-alkyl naphthalenes and 5–25% by weight of partially hydrogenated bicyclic hydrocarbons of the group consisting of tetralins, indanes and mixtures thereof, said reaction being conducted in the presence of 1.0–7.5 volumes of acetic acid per volume of aromatic fraction and 6–12% by weight, based on the weight of acetic acid, of zinc chloride, the reaction being conducted for 0.75–2 hours at the acetic acid reflux temperature under substantially anhydrous conditions whereby substantially only light colored resins are formed, said resins containing substantially no dark colored components, and having an average molecular weight of 475–600, and separating said resins from the reaction mixture.

References Cited by the Examiner

UNITED STATES PATENTS

| | | | |
|---|---|---|---|
| 2,216,941 | 10/40 | Gleason | 260—67 |
| 2,382,184 | 8/45 | Thompson | 260—67 |
| 2,397,398 | 3/46 | Badertscher et al. | 260—67 |
| 2,555,595 | 6/51 | Morris et al. | 260—78.4 |
| 2,608,550 | 8/52 | Rowland et al. | 260—68.4 |
| 2,660,572 | 11/53 | Feasley | 260—67 |
| 2,713,571 | 7/55 | Gordon et al. | 260—67 |
| 2,958,643 | 11/60 | Friedman | 260—672 |
| 3,005,800 | 10/61 | Powers | 260—78.4 |
| 3,037,877 | 6/62 | Hutchings | 260—67 |

OTHER REFERENCES

Fulton et al., Industrial and Engineering Chemistry, vol. 32, No. 3, March 1940, pp. 304–309.

WILLIAM H. SHORT, *Primary Examiner.*

LOUISE P. QUAST, *Examiner.*